United States Patent
Frantz et al.

(10) Patent No.: US 11,913,385 B2
(45) Date of Patent: Feb. 27, 2024

(54) AERONAUTICAL PROPULSION SYSTEM WITH IMPROVED PROPULSIVE EFFICIENCY

(71) Applicants: SAFRAN AIRCRAFT ENGINES, Paris (FR); SAFRAN TRANSMISSION SYSTEMS, Colombes (FR)

(72) Inventors: Caroline Marie Frantz, Moissy-Cramayel (FR); Gilles Alain Marie Charier, Moissy-Cramayel (FR); Matthieu Bruno François Foglia, Moissy-Cramayel (FR); Adrien Louis Simon, Moissy-Cramayel (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/031,917

(22) PCT Filed: Oct. 8, 2021

(86) PCT No.: PCT/FR2021/051755
§ 371 (c)(1),
(2) Date: Apr. 14, 2023

(87) PCT Pub. No.: WO2022/079378
PCT Pub. Date: Apr. 21, 2022

(65) Prior Publication Data
US 2023/0383698 A1   Nov. 30, 2023

(30) Foreign Application Priority Data

Oct. 16, 2020 (FR) ..................................... 2010640

(51) Int. Cl.
 F02C 7/36 (2006.01)
 F02K 3/06 (2006.01)
 F02C 7/04 (2006.01)
(52) U.S. Cl.
 CPC .................. F02C 7/36 (2013.01); F02K 3/06 (2013.01); *F02C 7/04* (2013.01); *F05D 2260/40311* (2013.01)
(58) Field of Classification Search
 CPC ...... F02C 7/04; F02C 7/36; F02K 3/06; F05D 2260/40311
 See application file for complete search history.

(56) References Cited

U.S. PATENT DOCUMENTS

2013/0331222 A1* 12/2013 Richards .................. F02C 7/36
                                                      475/331
2018/0023483 A1*  1/2018 Le Pache ................. F02C 7/36
                                                      475/331

(Continued)

FOREIGN PATENT DOCUMENTS

| EP | 3045772 A1 | 7/2016 |
| WO | 2015/012923 A2 | 1/2015 |
| WO | 2015/012923 A3 | 1/2015 |

OTHER PUBLICATIONS

Gray et al. "Energy Efficient Engine Preliminary Design and Integration Studies," NASA, 366 pgs., Nov. 1978.

(Continued)

*Primary Examiner* — William H Rodriguez
(74) *Attorney, Agent, or Firm* — Sughrue Mion, PLLC

(57) ABSTRACT

A propulsion system includes a drive shaft that rotates about an axis, a fan, a fan shaft that drives the fan about the axis, a reduction mechanism coupling the drive and fan shafts, a compression section driven by the drive shaft, and an inlet channel that extends between the fan and the compression section. The inlet channel includes inner and outer ferrules (Continued)

delimiting an air inlet flow path, the inner ferrule having a minimum radius. The reduction mechanism includes two reduction stages including two or more planet gears circumferentially distributed around the axis, each planet gear including a first portion meshed with the drive shaft and a second portion meshed with the fan shaft and being mounted fixed with respect to the inner ferrule and having a maximum radius greater than the minimum radius such that the air inlet flow path extends partly between the two or more planet gears.

15 Claims, 4 Drawing Sheets

(56) References Cited

U.S. PATENT DOCUMENTS

| 2019/0293170 A1* | 9/2019 | Schwarze | F16H 57/082 |
| 2019/0331212 A1* | 10/2019 | Simon | F16H 1/28 |
| 2022/0145806 A1* | 5/2022 | Beck | F16H 1/28 |
| 2023/0271695 A1* | 8/2023 | Charier | F01D 17/162 |
| | | | 244/69 |

OTHER PUBLICATIONS

French Preliminary Search Report dated Jul. 8, 2021 for Application No. FR2010640.
International Search Report and Written Opinion dated Jan. 31, 2022 for Application No. PCT/FR2021/051755.

* cited by examiner

AERONAUTICAL PROPULSION SYSTEM WITH IMPROVED PROPULSIVE EFFICIENCY

This Application is a National Stage of International Application No. PCT/FR2021/051755 filed Oct. 8, 2021, claiming priority based on French Patent Application No. 2010640 filed Oct. 16, 2020, the contents of each of which being herein incorporated by reference in their entireties.

FIELD OF THE INVENTION

This invention relates to the field of aeronautical propulsion systems, and more precisely bypass propulsion systems having a high, or even very high, bypass ratio, and a high propulsive efficiency.

PRIOR ART

A bypass propulsion system generally comprises, from upstream to downstream in the direction of flow of the gas, a fan, a primary annular flow space and a secondary annular flow space. The mass of air taken in by the fan is therefore divided into a primary flow, which circulates in the primary flow space, and into a secondary flow, which is concentric with the primary flow and circulates in the secondary flow space. The fan (or propeller) can be ducted and housed in a fan casing or in a unducted variant of USF (Unducted Single Fan) type. The fan blades can be fixed or have variable setting, the setting being adjusted as a function of the flight phases by a pitch change mechanism.

The primary flow space traverses a primary body comprising one or more compressor stages, for example a low-pressure compressor (or booster) and a high-pressure compressor, a combustion chamber, one or more turbine stages, for example a high-pressure turbine and a low-pressure turbine, and a gas exhaust nozzle. Typically, the high-pressure turbine rotationally drives the high-pressure compressor by way of a first shaft, the so-called high-pressure shaft, while the low-pressure turbine rotationally drives the low-pressure compressor and the fan by way of a second shaft, the so-called low-pressure shaft. The low-pressure shaft is generally housed in the high-pressure shaft.

To improve the propulsive efficiency of the propulsion system and reduce its specific fuel consumption and the noise emitted by the fan, provision has been made for propulsive systems having a high bypass ratio, i.e., the ratio of the flow rate of the secondary flow to the flow rate of the primary flow. The term "high bypass ratio" will here be understood to mean a bypass ratio greater than or equal to 10, for example between 10 and 80 inclusive. To achieve such bypass ratios, the fan is uncoupled from the low-pressure turbine, thus making it possible to independently optimize their respective rotation speeds. Generally, the uncoupling is done using a reduction gear such as an epicyclic or planet reduction mechanism, placed between the upstream end of the low-pressure shaft and the fan. The fan is then driven by the low-pressure shaft by way of the reduction mechanism and by an additional shaft, the so-called fan shaft, which is attached between the reduction mechanism and the fan disk.

This uncoupling thus makes it possible to reduce the speed of rotation and the pressure ratio of the fan and to increase the power extracted by the low-pressure turbine. Specifically, the propulsive efficiency is a prime determining factor of the overall efficiency of an aeronautical propulsion system. The propulsive efficiency is favorably influenced by the minimization of the variation in kinetic energy of the air on its way through the propulsion system. In a propulsion system with a high bypass ratio, most of the flow rate generating the propulsive force is constituted by the secondary flow of the propulsion system, the kinetic energy of the secondary flow being mainly affected by the compression it undergoes as it crosses the fan, which plays the role of a low-pressure compressor. The propulsive efficiency and the pressure ratio of the fan are therefore related: the lower the pressure ratio of the fan, the better the propulsive efficiency.

Beyond its major impact on the propulsive efficiency, the choice of the pressure ratio of the fan also affects various technological features of the propulsion system, including the fan diameter (and by extension the outer dimensions of the propulsion system and its pod, mass and drag), the rotation rating of the fan and the reduction ratio of the reduction mechanism.

However, (i) the more the reduction ratio increases, the more its radial bulk increases such that the reduction mechanism is difficult to incorporate under the primary flow path and (ii) the higher the speed of the low-pressure shaft, the higher the speed of the booster, which is driven by the low-pressure shaft, and the lower the average booster radius required to limit the peripheral speed at the tips of the blades of the booster.

These two combined limitations lead to an inlet channel of the primary flow path (usually referred to as a swan neck because of its shape) upstream of the booster having a slope that is greater when the radial bulk of the reduction mechanism is higher and the average booster radius is lower. This results in an increase of aerodynamic losses in this channel and a poor supply of the booster which adversely affect the propulsive efficiency of the propulsion system.

Currently, the preferred reduction mechanisms are of epicyclic reduction gear type, wherein the fan is driven by the planet pinion cage, the ring gear being attached to the stator of the engine. This is because such architectures make it possible to achieve higher reduction ratios than reduction mechanisms of sun type (driving of the fan by the ring gear). The use of an epicyclic reduction gear does however entail the transfer of oil from the fixed frame of reference of the engine to the rotary frame of reference of the planet pinion cage to supply the bearings and toothing of this reduction gear.

DISCLOSURE OF THE INVENTION

One aim of the invention is to make provision for an aeronautical propulsion system, such as a bypass turbomachine, the fan of which is ducted, with or without variable setting of the fan blades, or such as an unducted propulsion system of USF type, having a high bypass ratio and an improved propulsive efficiency and with a transmission system with a high reduction ratio, of small bulk and simplified.

For this purpose provision is made, according to a first aspect of the invention, for an aeronautical propulsion system comprising:
- a drive shaft rotationally movable about an axis of rotation,
- a fan,
- a fan shaft configured to rotationally drive the fan about the axis of rotation,
- a reduction mechanism coupling the drive shaft and the fan shaft, a compression section rotationally driven by the drive shaft, an inlet channel that extends between the fan and the compression section, the inlet channel comprising an inner ferrule and an outer ferrule together delimiting an air inlet flow path in the compression section, the inner ferrule having a predetermined minimum radius.

Moreover, the reduction mechanism comprises two reduction stages including at least two planet gears circumferentially distributed around the axis of rotation, each planet gear comprising a first portion meshed with the drive shaft and a second portion meshed with the fan shaft. Each planet gear is mounted fixed with respect to the inner ferrule of the inlet casing and each planet gear has a predetermined maximum radius, said maximum radius being greater than the minimum radius of the inner ferrule of the inlet channel such that the air inlet flow path extends at least partly between the two planet gears.

The aircraft propulsion system may comprise a bypass turbomachine with a ducted fan, with or without variable setting of the fan blades, or an unducted propulsion system of USF type.

Certain preferred but non-limiting features of the propulsion system are as follows, taken individually or in combination:
- the inlet casing has an inlet adjacent to the fan and an outlet adjacent to the compression section, a section of the outer ferrule of the inlet casing in a plane radial to the axis of rotation being substantially circular at the level of the inlet;
- a passage of the air inlet flow path is discontinuous about the axis of rotation;
- the reduction mechanism is housed in a casing, said casing forming a single unit with the inner ferrule of the inlet channel;
- the casing of the reduction mechanism comprises, at the level of each planet gear, a series of bulges, which are each configured to house an associated planet gear;
- the bulges are connected pairwise by ring segment portions of the casing;
- the casing of the reduction mechanism is connected to the outer ferrule by way of support arms extending from the bulges;
- the bulges have a ring segment shape, a radius of which is greater than the radius of the casing portions that extend between the bulges;
- the part of the inner ferrule of the inlet casing that extends between two adjacent planet gears has a boss downstream of the inlet;
- the boss extends all the way to the compression section;
- the propulsion system further comprises a rotary multiple-passage hydraulic seal positioned at the level of the fan shaft, upstream of the reduction mechanism;
- the planet gears are mounted on a planet pinion cage and the propulsion system further comprises an oil reservoir and at least one duct passing through the planet pinion cage and configured to supply the reduction mechanism with oil;
- the reduction mechanism has a reduction ratio greater than or equal to 2, preferably greater than or equal to 2.2 in the case of a ducted fan and greater than or equal to 5 in the case of an unducted fan and/or
- the propulsion system has a bypass ratio greater than or equal to 10 and less than or equal to 80.

According to a second aspect, the invention makes provision for an aircraft comprising an aircraft propulsion system in accordance with the first aspect.

DESCRIPTION OF THE FIGURES

Other features, aims and advantages of the invention will become apparent from the following description, which is purely illustrative and non-limiting, and which must be read with reference to the appended drawings wherein.

In all the figures, similar elements bear identical reference numbers.

DETAILED DESCRIPTION OF THE INVENTION

Figure 1:
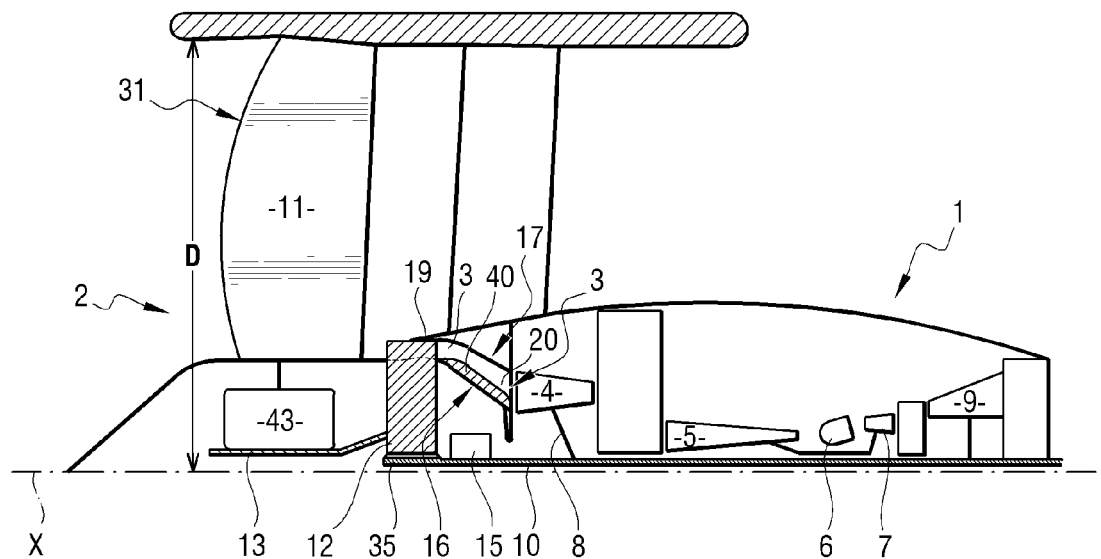
FIG. 1 schematically illustrates an example of an aircraft propulsion system comprising a ducted fan with variable setting in accordance with an embodiment of the invention.

The propulsion system 1 conventionally comprises a fan 2 and a primary body. The primary body comprises, in the direction of flow of the gas of the propulsion system 1, an inlet channel 3 extending immediately downstream of the fan 2, a low-pressure compressor 4 (or booster 4), a high-pressure compressor 5, a combustion chamber 6, a high-pressure turbine 7, a low-pressure turbine 9 and a gas exhaust nozzle. The high-pressure turbine 7 rotationally drives the high-pressure compressor 5 by way of a high-pressure shaft 8 while the low-pressure turbine 9 rotationally drives the low-pressure compressor 4 and the fan 2 by way of a low-pressure shaft 10.

The fan 2 comprises a fan disk 2a (particularly FIGS. 3b and 4b) provided on its periphery with fan blades 11 which, when they are rotated, drive the air flow into the primary and secondary flow spaces of the propulsion system 1.

The booster 4 comprises at least one compression stage comprising a wheel 14 of movable blades (rotor) driven by the low-pressure shaft 10 and rotating in front of a series of fixed vanes (stators, or straighteners) circumferentially distributed around the X axis. Where applicable, the booster 4 may comprise at least two compression stages.

The inlet channel 3 extends immediately downstream of the fan 2. It has an entrance 18, adjacent to the root 17 of the fan blades 11, plumb with the forward fairing 19 of the primary flow space and the secondary flow space and an outlet 20 adjacent to the booster 4. The inlet channel 3 has the general shape of a swan neck, such that the entrance 18 is radially further from the axis of rotation X than the outlet 20. The inlet channel 3 comprises, in a manner known per se, a row of fixed vanes circumferentially distributed about the axis X between an inner ferrule 16 and an outer ferrule 17, which together delimit an air inlet flow path in the booster 4. The inner ferrule 16 and the outer ferrule 17 of the inlet channel 3 extend circumferentially around the axis of rotation X and are fixed in the engine frame of reference. Typically, the inner ferrule 16 and the outer ferrule 17 can be connected to a casing of the engine, such as the inlet casing 3.

The invention is applicable to any type of bypass aircraft propulsion system 1, whether the fan is ducted or unducted, with fixed vanes or variable setting.

In this application, the upstream and the downstream are defined with respect to the normal direction of flow of the gas in the fan and through the propulsion system. Moreover, the axial direction corresponds to the direction of the axis of rotation X and a radial direction is a direction perpendicular to this axis of rotation X and passing through it. Moreover, the circumferential (or lateral) direction corresponds to a direction perpendicular to the axis of rotation X and not passing through it. Unless otherwise specified, inner (or inward) and outer (or outward) respectively are used with reference to a radial direction such that the part or inner face of an element is closer to the axis of rotation X than the outer part or face of the same element.

The propulsion system 1 has a high bypass ratio. The term "high bypass ratio" should be understood to mean a bypass ratio greater than or equal to 10, for example between 10 and 80. To do this, the fan 2 is uncoupled from the low-pressure turbine 9 to independently optimize their respective rotation speed using a reduction mechanism 12 placed between the upstream end (with respect to the flow direction of the gas in the propulsion system 1) of the low-pressure shaft 10 and the fan 2. The fan 2 is then driven by the low-pressure shaft 10 by way of the reduction mechanism 12 and by way of a fan shaft 13, which is attached between the reduction mechanism 12 and the disk 2a of the fan 2. The fan shaft 13 is rotationally movable about an axis of rotation X coaxial with the axis of rotation X of the low-pressure shaft 10.

To compute the bypass ratio, the flow rate of the secondary flow and the flow rate of the primary flow are measured when the propulsion system 1 is stationary in take-off rating in a standard atmosphere (as defined by the International Civil Aviation Organization (ICAO), Doc 7488/3, $3^{rd}$ edition) and at sea level. In the remainder of the text, all the parameters will be measured in these conditions.

To improve the propulsive efficiency of the propulsion system 1, the reduction mechanism is two-stage and static. More precisely, the reduction mechanism 12 comprises two reduction stages 27, 32, each stage 27, 32 including at least two planet gears 28 circumferentially distributed around the axis of rotation X and comprising a first portion 38 meshed with the low-pressure shaft 10 and a second portion 39 meshed with the fan shaft 13. The first portions 38 of the planet gears 28 extend in one and the same plane, the so-called first plane, and form the first stage 27 of the reduction mechanism 12 while the second portions 39 of the planet gears 28 extend in one and the same plane, the so-called second plane, which is parallel to that of the first portions 38, and form the second stage 32 of the reduction mechanism 12. The second plane is axially offset with respect to the first plane. For example, the reduction mechanism 12 may comprise three planet gears 28 or more.

The planet gears 28 are mounted fixed with respect to the inner ferrule 16 of the inlet channel 3 and each have a predetermined maximum radius R1 which corresponds to the bulk radius of the planet gears 28. In addition, the maximum radius R1 of the planet gears 28 is greater than the minimum radius R2 of the inner ferrule 16 of the inlet channel 3 such that the air inlet flow path extends at least partly between two adjacent planet gears 28. The term "maximum radius R1 of the planet gears 28" should be understood to mean the maximum distance, in a plane radial to the axis of rotation X, between the axis of rotation X and the outer radial surface of the planet gears 28. Here, the maximum radius R1 is therefore measured at the level of the first portion 38 of the planet gears 28, the diameter of which is greater than that of the second portions 39. Moreover, the term "minimum radius R2 of the inner ferrule 16 of the inlet channel 3" should be understood to mean the minimum distance in a plane radial to the axis of rotation X, between the axis of rotation X and the inner ferrule 16, at the entrance 18 of the inner ferrule 16 3. More precisely, the minimum radius R2 of the inner ferrule 16 is measured at the level of the most upstream part of the forward fairing 19.

The reduction mechanism 12 thus does not comprise any radially bulky component which is movable about the axis of rotation X, since the fan shaft 13 is meshed directly with the second portion 39 of the planet gears 28 and the planet gears 28 are static in the engine frame of reference (being attached on the inner ferrule 16 of the inlet casing 3). This results in the reduction mechanism 12 not comprising any ring gear or planet pinion cage 21 movable about the axis of rotation X. The centrifugal forces undergone by the reduction mechanism 12 are therefore much lower than in the reduction mechanisms of sun or epicyclic gear type.

In addition, the air inlet flow path passing in part between the planet gears 28, the minimum radius R2 of its inner ferrule 16 is lower at the level of the entrance 18 than in the prior art such that the slope of the inlet channel 3 upstream of the booster 4 is more gentle, which improves the supply to the booster 4. In particular, the minimum radius R2 is at the most equal to 90% of the maximum radius R1 of the planet gears 28, preferably at the most equal to 80% of that of the maximum radius R1.

The use of a two-stage reduction mechanism 12 furthermore makes it possible to achieve high, or even very high, reduction ratios for a lower radial bulk than in engines of the prior art. This decrease in the radial bulk of the reduction mechanism 12, for a same reduction ratio, has the effect of making the slope of the inlet channel 3 of the primary flow path upstream of the booster 4 even more gentle. Thus, the choice of a two-stage and static reduction mechanism 12 doubly improves the supply to the booster 4 and therefore the propulsive efficiency of the propulsion system 1.

Where applicable, it is also possible to choose to limit the increase in the axial bulk of the compression/reduction coupling, conserving a steep inlet channel slope, by reducing the distance between the reduction gear and the compressor.

The reduction mechanism 12 is housed in a casing 23 which forms a single unit with the inner ferrule 16 of the inlet channel 3. Insofar as the minimum radius R2 of the inner ferrule 16 is less than the maximum radius R1 of the planet gears 28 to allow the passage of the air flow path between the adjacent planet gears 28, the casing 23 of the reduction mechanism 12 is not cylindrical.

More precisely, the casing 23 of the reduction mechanism 12 comprises, at the level of the planet gears 28, a series of bulges 25 which are each configured to house an associated planet gear, the bulges 25 being connected pairwise by ring segment portions 26 of the casing. The term "ring segment" should be understood to mean that these portions 26 of the casing 23 have a section, in a plane radial to the axis of rotation X, which is curved and equivalent to a semicircle. The ring segment portions 26 all have one and the same radius. Where applicable, the radius of the ring segment portions 26 is equal to the minimum radius R2 of the inner ferrule 16.

Figure 4A:
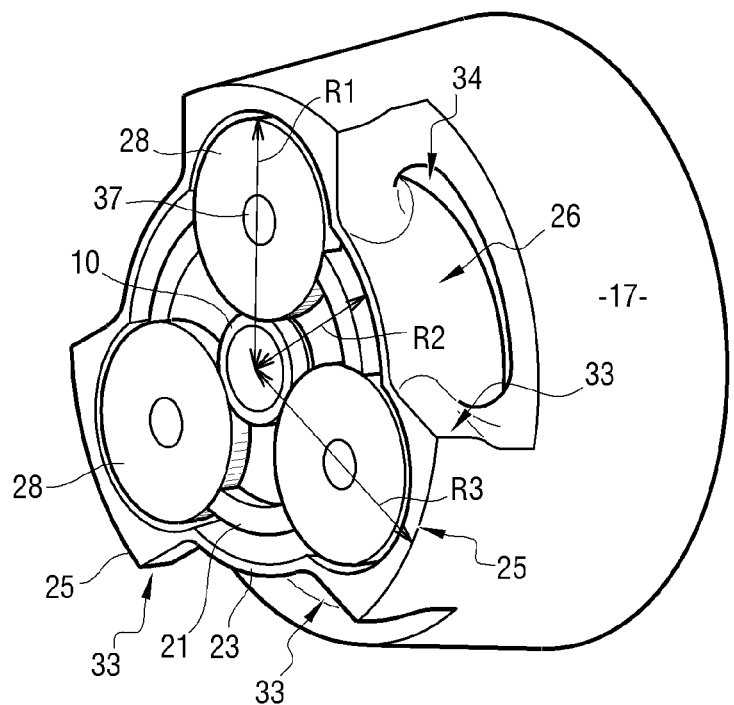
FIG. 4a is a partial and schematic perspective view of a second example of a reduction mechanism and of the air inlet of an aircraft propulsion system in accordance with the invention.
Figure 4B:
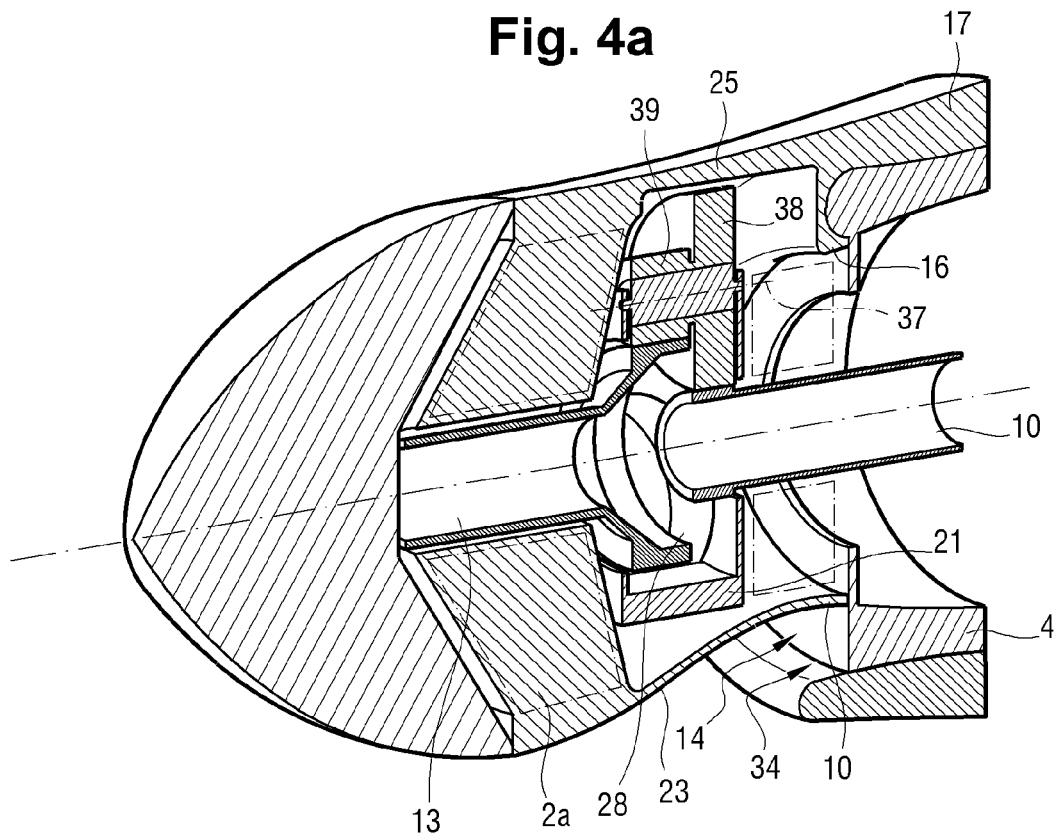
FIG. 4b is a schematic and section view of the propulsion system of FIG. 4a, which moreover represents the inlet cone of the propulsion system.

In a first form of embodiment illustrated in FIGS. 4a and 4b, the entrance 18 of the inlet channel 3 is segmented, i.e., it is not circumferentially continuous. The entrance 18 then comprises several circumferential sections, separated pairwise by a bulge 25 of the casing 23 of the reduction mechanism 12 and which each form a passage for the flow path.

To do this, in an embodiment, the bulges 25 have a ring segment shape, the radius R3 of which is greater than that of the casing 23 portions 26 that extend between the bulges 25. In this embodiment, the radius R3 of the bulges 25 can be substantially equal to that of the outer ferrule 17 of the inlet 3 casing 23. The bulges 25 are then connected to the adjacent ring segment portions by two walls 33 which extend substantially along the direction of the flow at the inlet of the channel 3. The wall 33 can be planar or in a variant, as illustrated in FIG. 4a, curved such as to successively form in the direction of flow of the gas a section which is convergent then divergent for the flow, in the manner of a de Laval nozzle. The entrance 18 of the inlet channel is then formed by the passages 34 which are each delimited by a portion 26 of the ring segment casing 23 and the walls 33 extending on either side of this portion 26. Typically, in the case of a reduction mechanism 12 comprising three planet gears 28, the casing 23 comprises three portions 26 in the shape of ring segments forming, with the three pairs of walls 33 extending on either side of each planet gear 28, three circumferential passages 34 for the entrance of the air flow path into the inlet channel 3.

Figure 3A:
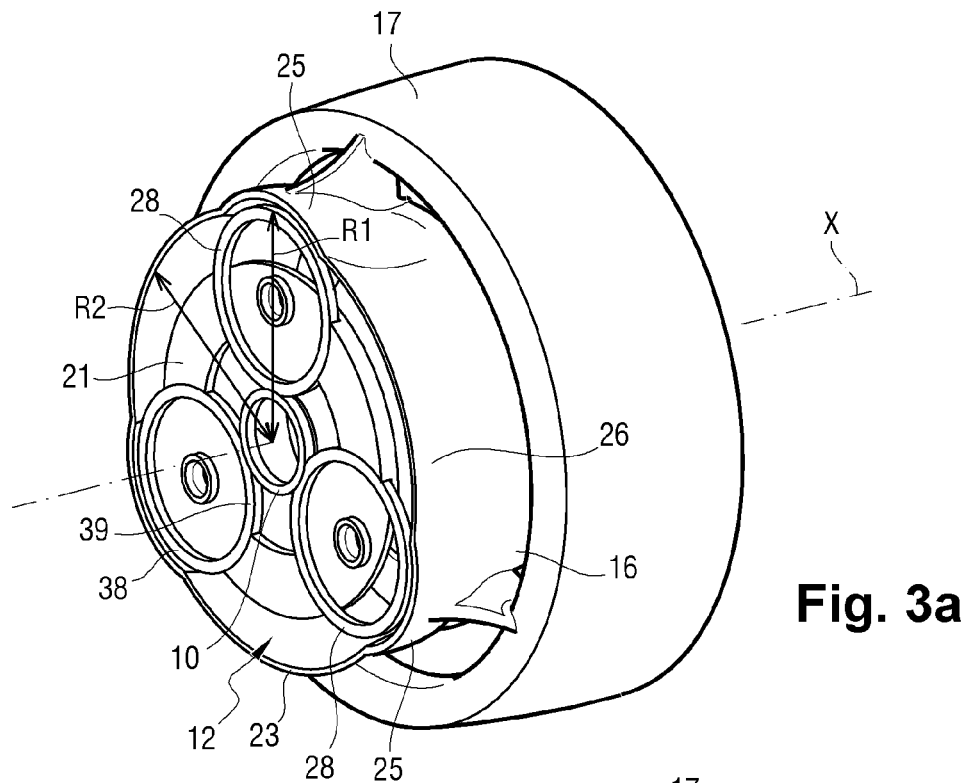
FIG. 3a is a partial and schematic perspective view of a first example of a reduction mechanism and air inlet of an aircraft propulsion system in accordance with the invention.
Figure 3B:
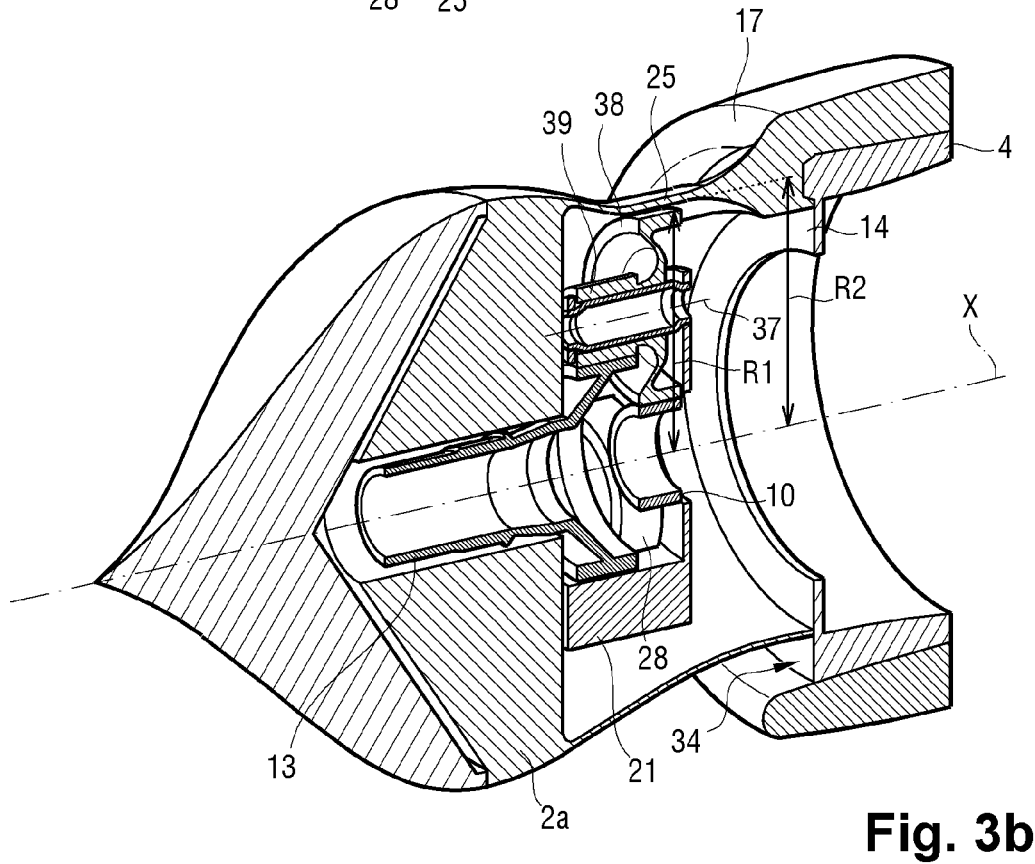
FIG. 3b is a schematic and section view of the propulsion system of FIG. 3a, which moreover represents the inlet cone of the propulsion system.

In a variant, in a second form of embodiment illustrated in FIGS. 3a and 3b, the entrance 18 of the inlet channel 3 is continuous over its entire circumference around the axis of rotation X.

In this form of embodiment, the reduction mechanism 12 comprises bulges 25, substantially curved, the shape and dimensions of which are adjusted to the shape and dimensions of the planet gears 28. The casing 23 is moreover connected to the outer ferrule 17 by way of support arms 36 extending from the bulges 25. Typically, the propulsion system 1 may comprise as many support arms 36 as there are planet gears 28, each support arm 36 extending from the apex of a bulge 25 housing a planet gear 28. The inlet of the air flow path into the inlet channel 3 is therefore formed by a single continuous circumferential passage 35 around the axis of rotation X. The outer ferrule 17 of the inlet 3 casing 23 is therefore substantially circular at the bulges 25 while the inner ferrule 16 is not cylindrical.

The presence of the bulges 25 is liable to modify the tangential speed of the air flow at the inlet of the booster 4. In a form of embodiment, the inner ferrule 16 then comprises a boss 40 downstream of the entrance 18, in the extension of at least one portion 26 of the casing 23 of the reduction mechanism 12 that extends between two adjacent planet gears 28, for example in the extension of the ring segment portions 26 of the casing 23. The bosses 40 may extend over the entire length of the inlet channel 3 or in a variant over a part only of the inlet channel 3.

In a form of embodiment, the inner ferrule 16 comprises as many bosses 40 as there are planet gears 28, each boss 40 extending in the extension of the portion 26 of the casing 23 positioned between two adjacent planet gears.

A high reduction ratio makes it possible to reduce the rotation speed and the compression ratio of the fan 2 and to optimize the dimensioning of the low-pressure turbine 9. The propulsive efficiency of the propulsion system 1 is therefore improved.

Figure 5:
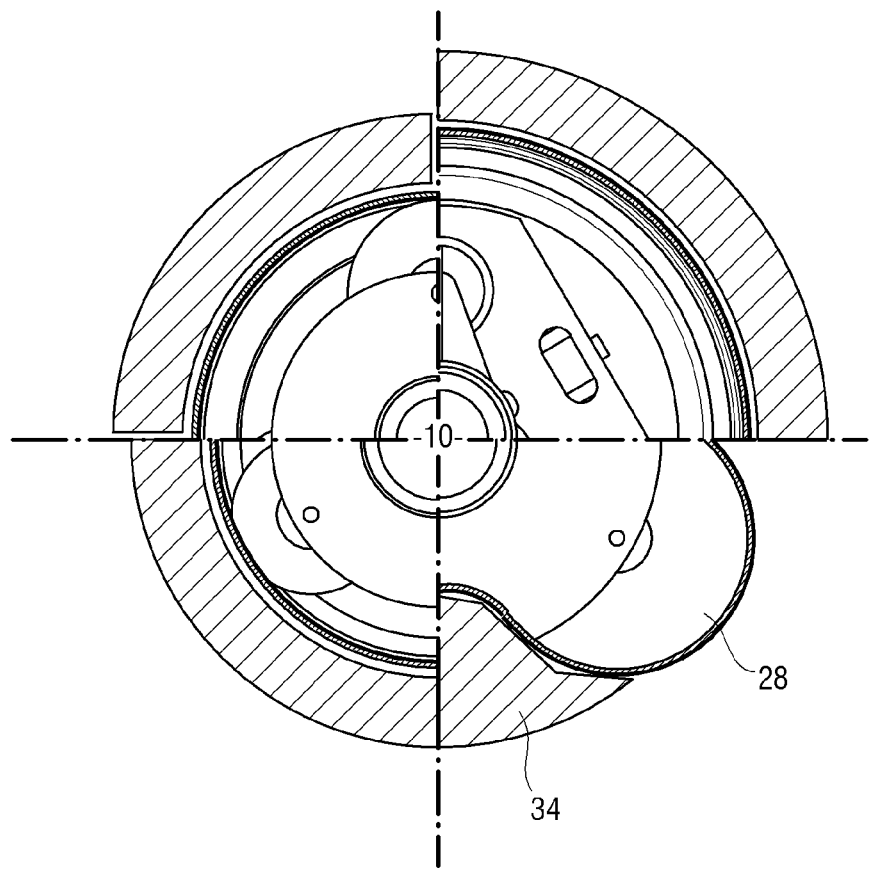
FIG. 5 is a partial and schematic section view illustrating, in four quadrants, a two-stage sun gear reduction mechanism (top left), a single-stage epicyclic reduction mechanism (top right), a two-stage epicyclic reduction mechanism (bottom left) and the reduction mechanism of the invention (bottom right), with their respective air inlet flow path, these four reduction mechanisms all having a same reduction ratio.

By way of comparison, FIG. 5 illustrates the radial bulk obtained for four reduction mechanisms of different technology but all having a same reduction ratio with, clockwise from the top left quadrant of FIG. 5, a two-stage sun reduction mechanism, an epicyclic reduction mechanism, a two-stage and static reduction mechanism 12 and a two-stage epicyclic reduction mechanism. It is apparent from this comparison that the reduction mechanism locally having the smallest radial bulk, for one and the same reduction ratio, is the static two-stage reduction mechanism 12, owing to the space freed up between the fixed planet gears 28 for the passage 34 of the air flow path.

The reduction ratio of the two-stage sun reduction mechanism is at least equal to 2.

In the case of a propulsion system 1 comprising a ducted fan 2 (FIG. 1), and where applicable the variable-setting fan blades 11, the reduction ratio greater than or equal to 2.2, for example between 2.2 and 6.

Figure 2:
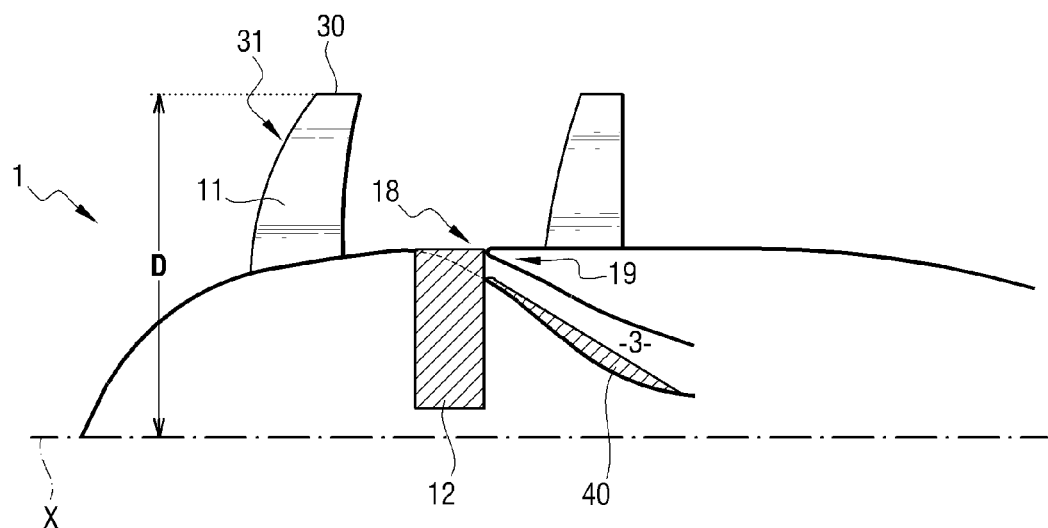
FIG. 2 schematically illustrates an example of an aircraft propulsion system comprising an unducted fan of USF type in accordance with an embodiment of the invention.

In the case of a propulsion system 1 comprising an unducted fan 2 (FIG. 2), for example of USF type, the reduction ratio greater than or equal to 5, for example between 5 and 9. The term "fan of USF type" should here be understood to mean an aircraft turbomachine comprising an unducted fan 2 (propeller), a gas generator intended to rotationally drive the unducted fan 2 about the longitudinal axis X and at least one straightener comprising a plurality of variable-setting stator vanes extending along a radial axis perpendicular to the longitudinal axis X from a fixed casing.

In an embodiment, the planet gears 28 are mounted rotationally movable on a planet pinion cage 21 about a respective axis of revolution 37, for example by way of journal bearings. The planet pinion cage 21 is on the other hand fixed in the engine frame of reference. For example, the planet pinion cage 21 can be attached to the inner ferrule 16 of the inlet 3 casing 23.

Each planet gear 28 is rotationally symmetrical with respect to its axis of revolution 37. The diameter of the first portion 38 is different from the diameter of the second portion 39. Each portion 38, 39 of the planet gears 28 thus forms a stage 27, 32 of the reduction mechanism 12. More precisely, the first portion 38 of each planet gear 28 is rotationally cylindrical with respect to its axis of revolution 37 and has an outer radial surface configured to interact with the outer radial surface of the upstream end 35 of the low-pressure shaft 10. To do this, the inner radial surface of the first portion 38 of the planet gears 28 comprises meshing means, typically teeth 29, configured to mesh with a spline of the upstream end 35 of the low-pressure shaft 10.

The second portion 39 of each planet gear 28 is rotationally cylindrical with respect to its axis of revolution 37 and has an inner radial surface configured to interact with the outer radial surface of the fan shaft 13. To do this, the inner surface of this second portion 39 also comprises meshing means, typically teeth 29, configured to mesh with a spline formed on the upstream end 35 of the low-pressure shaft 10.

The meshing means can comprise straight, helical or herringbone teeth.

The first portion 38 and the second portion 39 of each planet gear 28 are single-unit. For example, the first portion 38 and the second portion 39 of one and the same planet gear 28 can be formed entirely of a single part (monolithic). In a variant, the first portion 38 and the second portion 39 of one and the same planet gear 28 can be assembled.

Moreover, the planet gears 28 of one and the same reduction mechanism 12 are identical in shape and in dimension.

In operation, the rotation of the low-pressure shaft 10 about the axis of rotation X therefore rotationally drives the first portion 38 of the planet gears 28 about their axis of revolution 37 (the axes of revolution 37 being fixed with respect to the inner ferrule 16 of the inlet 3 casing 23), which form a single unit with their second portion 39 and therefore drive, at a different speed, the fan shaft 13 in rotation about this axis of rotation X.

The second portions 39 of the planet gears 28 have a diameter strictly smaller than the diameter of the first portion 38. This is specifically the difference in diameter between the first portion 38 and the second portion 39 of the planet gears 29 which makes it possible to obtain higher reduction ratios than in a single-stage reduction mechanism 12, for a comparable radial bulk. As a result, the diameter of the first portion 38 and the diameter of the second portion 39 of the planet gears 28 can thus be dimensioned so as to achieve a reduction ratio greater than or equal to 2 with small radial bulk, thus making it possible to make the slope of the inlet channel 3 more gentle.

In a form of embodiment, since the planet gears 28 are fixed in the engine frame of reference, the hydraulic seal 15 can be placed upstream of the reduction mechanism 12 and fluid-connected to the oil reservoir of the lubrication unit by way of ducts passing through the planet pinion cage 21. In other words, it is no longer necessary to transfer the oil from the fixed frame of reference of the engine to a rotary frame of reference of the reduction mechanism 12 to supply the bearings and toothing of the reduction mechanism: it suffices to transfer the oil directly into the ducts passing through the planet pinion cages 21, which is fixed, and then supply the bearings and toothing 29 of the reduction mechanism 12 from these ducts.

The structure of the hydraulic seal 15 and its supply are therefore simplified.

Since the hydraulic seal 15 is placed upstream of the reduction mechanism 12, it is easier to access, which simplifies maintenance operations.

In this first embodiment, the hydraulic seal 15 can for example be mounted on the fan shaft 13. For example, the hydraulic seal 15 comprises a rotary part mounted on the fan shaft 13 and a fixed part mounted on the planet pinion cage 21.

Optionally, the propulsion system 1 further comprises a pitch change mechanism 43 configured to modify the angle of setting of the fan blades 11 as a function of the flight phases of the propulsion system. This pitch change mechanism 43 then requires lubrication means (such as injection nozzles) supplied with oil by the hydraulic seal 15. The propulsion system 1 therefore further comprises oil supply flow paths 2 extending between the rotary part of the hydraulic seal 15 and the pitch change mechanism 43. These flow paths are rotationally secured to the rotary part of the hydraulic seal 15.

Advantageously, since the hydraulic seal 15 is positioned upstream of the reduction mechanism 12, the distance between the hydraulic seal 15 and the lubrication means is shorter, and therefore simpler, than in the prior art.

In addition, only the portion of the hydraulic seal 15 supplying the lubrication means of the pitch change mechanism 43 comprises a rotary portion, the hydraulic seal 15 being supplied via the ducts passing through the planet pinion cage 21, which are fixed.

Moreover, in the case of a propulsion system 1 comprising a ducted fan 2, the diameter D of the fan can be between 105 inches (266.7 cm) and 135 inches (342.9 cm). In the case of a propulsion system comprising an unducted fan 2, the diameter D of the fan 2 can be between 150 inches (381 cm) and 180 inches (457.2 cm), for example in the order of 167 inches (424.18 cm). The term "fan 2 diameter D" should here be understood to mean the double of the distance, in a plane radial to the axis of rotation X, measured between the axis of rotation X and the apex 30 of the fan blades 11 at the intersection between the leading edge 31 the apex 30 of the blade 11. The term "leading edge 31" should here be understood to mean the edge of the fan 11 configured to extend facing the flow of the gas entering the fan 2. It corresponds to the forward part of an aerodynamic profile which faces the air flow and which divides the air flow into a pressure surface flow and a suction surface flow. The trailing edge meanwhile corresponds to the aft part of the aerodynamic profile, where the pressure and suction surface flows meet.

In addition, for these fan 2 diameters D and rotation ratings, the compression ratio of the ducted fan 2 can be between 1.04 and 1.29 while the pressure ratio of the unducted fan 2 can be between 1.01 and 1.025. The compression ratio of the fan 2 is here measured under the same conditions as the bypass ratio, i.e., when the propulsion system 1 is stationary in the take-off rating in a standard atmosphere (as defined by the International Civil Aviation Organization (ICAO), Doc 7488/3, 3 rd edition) and at sea level.

The bypass ratio of the propulsion system 1 can then be between 10 and 31 in the case of a ducted fan and between 40 and 80 in the case of an unducted fan 2.

The peripheral speed at the tips of the fan blades 11 (i.e., measured at their apex 30) in the take-off rating as defined above is between 260 m/s and 330 m/s when the fan 2 is ducted and is less than 225 m/s when the fan 2 is unducted.

The invention claimed is:

1. An aeronautical propulsion system comprising:
   a drive shaft rotationally movable about an axis of rotation,
   a fan,
   a fan shaft configured to rotationally drive the fan about the axis of rotation,
   a reduction mechanism coupling the drive shaft and the fan shaft,
   a compression section rotationally driven by the drive shaft,
   an inlet channel that extends between the fan and the compression section, the inlet channel comprising an inner ferrule and an outer ferrule together delimiting an air inlet flow path in the compression section, the inner ferrule having a predetermined minimum radius,
   wherein the reduction mechanism comprises two reduction stages including at least two planet gears circumferentially distributed around the axis of rotation, each planet gear comprising a first portion meshed with the drive shaft and a second portion meshed with the fan shaft,
   wherein each planet gear is mounted fixed with respect to the inner ferrule of the inlet channel, and wherein
   each planet gear has a predetermined maximum radius, the predetermined maximum radius being greater than the predetermined minimum radius of the inner ferrule of the inlet channel such that the air inlet flow path extends at least partly between the at least two planet gears.

2. The aeronautical propulsion system according to claim 1, wherein the inlet channel has an inlet adjacent to the fan and an outlet adjacent to the compression section, a section of the outer ferrule of the inlet channel in a plane radial to the axis of rotation being substantially circular at the level of the inlet.

3. The aeronautical propulsion system according to claim 1, wherein a passage of the air inlet flow path is discontinuous about the axis of rotation.

4. The aeronautical propulsion system according to claim 3, wherein the reduction mechanism is housed in a casing of the reduction mechanism, the casing of the reduction mechanism forming a single unit with the inner ferrule of the inlet channel.

5. The aeronautical propulsion system according to claim 4, wherein the casing 23 of the reduction mechanism comprises a plurality of bulges, wherein each bulge is both at a level of each a planet gear of the at least two planet gears and configured to house the planet gear.

6. The aeronautical propulsion system according to claim 5, wherein the bulges are connected pairwise by ring segment portions of the casing of the reduction mechanism.

7. The aeronautical propulsion system according to claim 5, wherein the casing of the reduction mechanism is connected to the outer ferrule by way of support arms extending from the bulges.

8. The aeronautical propulsion system according to claim 6, wherein each bulge has a bulge ring segment, a radius of the bulge ring segment being greater than a radius of the ring segment portions of the casing of the reduction mechanism.

9. The aeronautical propulsion system according to claim 2, wherein a part of the inner ferrule of the inlet channel that extends between two adjacent planet gears of the at least two planet gears has a boss downstream of the inlet of the inlet channel.

10. The aeronautical propulsion system according to claim 9, wherein the boss extends to the compression section.

11. The aeronautical propulsion system according to claim 1, further comprising a rotary multiple-passage hydraulic seal positioned at a level of the fan shaft, upstream of the reduction mechanism.

12. The aeronautical propulsion system according to claim 11, wherein the at least two planet gears are mounted on a planet pinion cage and wherein the aeronautical propulsion system further comprises an oil reservoir and at least one duct passing through the planet pinion cage and configured to supply the reduction mechanism with oil.

13. The aeronautical propulsion system according to claim 1, wherein the reduction mechanism has a reduction ratio greater than or equal to 2.

14. The aeronautical propulsion system according to claim 1, having a bypass ratio greater than or equal to 10 and less than or equal to 80.

15. An aircraft comprising the aeronautical propulsion system according to claim 1.

* * * * *